March 8, 1932.  R. D. HOGG  1,848,564
ANTIGLARE DEVICE FOR VEHICLES
Filed May 7, 1928
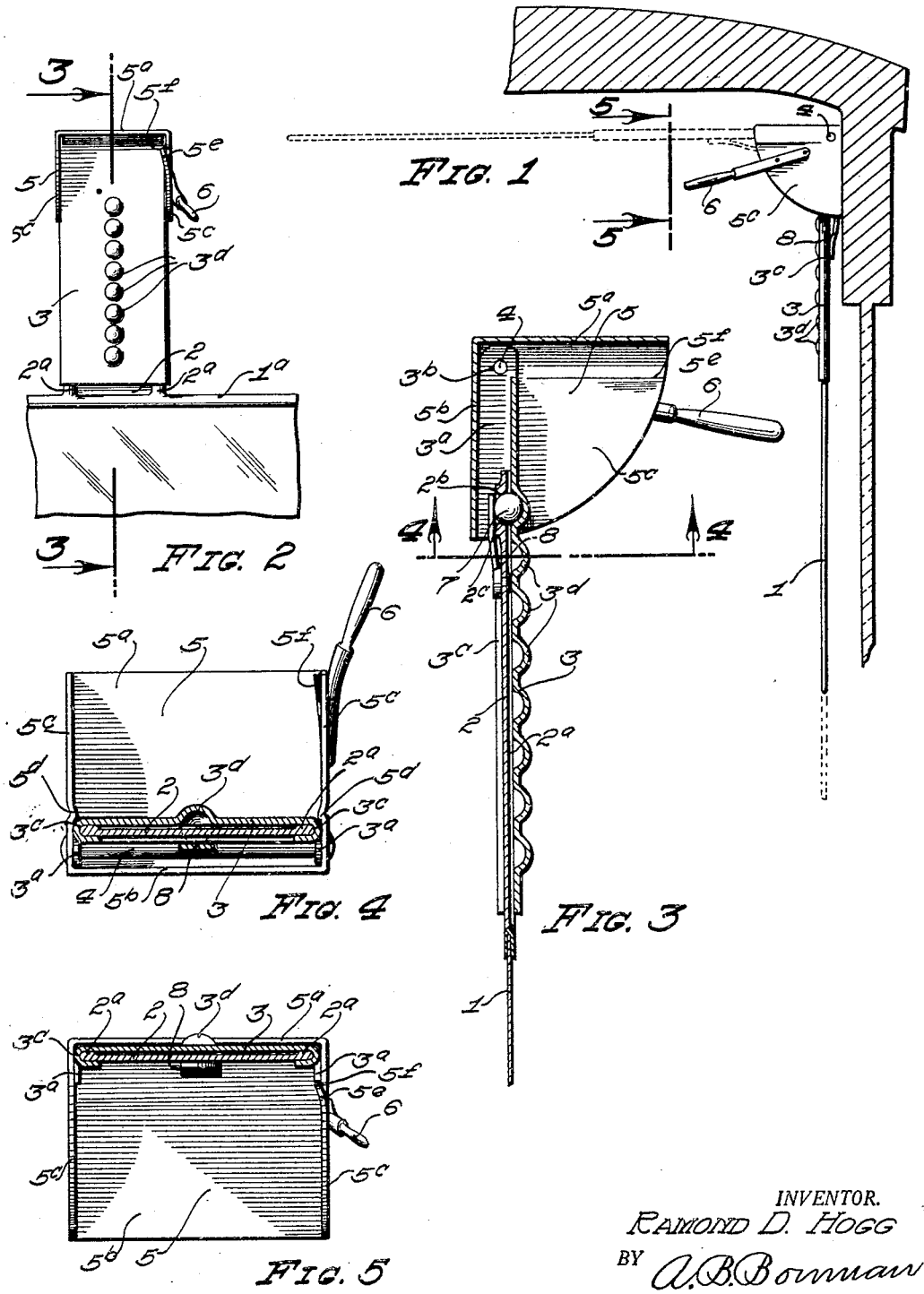
INVENTOR.
RAMOND D. HOGG
BY A. B. Bowman
ATTORNEY Patented Mar. 8, 1932

1,848,564

UNITED STATES PATENT OFFICE

RAYMOND D. HOGG, OF LA JOLLA, CALIFORNIA

ANTIGLARE DEVICE FOR VEHICLES

Application filed May 7, 1928. Serial No. 275,848.

My invention relates to an anti-glare device for vehicles and the objects of my invention are: first, to provide means for mitigating the glare of sun or headlights directed into the eyes of the driver of a vehicle; second, to provide an anti-glare device which is positioned within easy reach of the driver; third, to provide a device which may be readily released for raising or lowering by the simple manipulation of a catch means; fourth, to provide a device which is automatically locked in either the raised or lowered position and which will not jar loose when in these positions; fifth, to provide a device of this type which is of very light structure so that only very slight forces are exerted on the bracket means for supporting it on the vehicle; sixth, to provide a device which may be quickly adjusted lengthwise to suit the level of the driver's eyes or the inclination of the objectionable light which it is desired to mitigate; seventh, to provide an anti-glare device which may be readily and quickly mounted above the windshield of any closed vehicle; and eighth, to provide an anti-glare device which is of simple structure, economical of manufacture and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is an elevational view of my device showing it mounted in position behind the windshield of a closed car, portions of which are shown in outline, and also showing the position of the device in dotted lines when raised clear of the windshield; Fig. 2 is a fragmentary elevational view of my device showing a portion only of the glare shield with the longitudinally adjustable pivoted arm; Fig. 3 is an enlarged cross sectional view thereof taken along the line 3—3 of Fig. 2 showing details of the pivoted adjustable arm; Fig. 4 is a cross sectional view taken along the line 4—4 of Fig. 3, and Fig. 5 is an enlarged sectional view taken along the line 5—5 of Fig. 1.

Similar characters of reference refer to similar parts and portions throughout the several views of the drawings.

The glare shield 1, extension arm 2, pivoted arm 3, pivot pin 4, bracket member 5, lock lever 6, ball catch 7, and retaining member 8, form the principal parts and portions of my novel anti-glare device.

The glare shield 1 is made preferably of a translucent colored material such as green or amber celluloid and may be of rectangular outline, the upper margin thereof being strengthened by means of channel-shaped sheet metal members 1a extending lengthwise therewith. To the strengthening frame member 1a is secured an outwardly extending arm 2 made preferably of a straight metal strip having slightly thickened side-margins 2a. The pivoted arm 3 is provided at its one end portion with right angularly bent flange members 3a extending a short length thereof. At the upper end of the flange members 3a are provided apertures 3b forming bearings for a pivot pin 4. From the inner end of the flange members 3a to the other end of the arm, the margins are bent inwardly forming oppositely disposed channel portions 3c which are adapted to serve as guides for the extension arm 2, the width of the channels 3c being sufficient to accommodate the thickened margins 2a of the extension arm 2.

As shown in Fig. 4, the central portions of the arms 2 and 3 are slightly spaced apart owing to the thickened margins 2a acting as spacers. The pivoted arm 3 is provided along its longitudinal median line with a plurality of substantially equally spaced indents 3d, said indents being preferably semi-spherical in form and of a radius corresponding to the ball catch member 7. The latter is accommodated within an aperture 2b provided at the upper end of the extension arm 2 at a point in the longitudinal median line thereof. A boss 2c is provided around the aperture 2b for the purpose of providing a somewhat deeper wall than afforded by the central portion of the arm 2. As shown in Fig. 3, the ball 7 is inserted in the aperture 2b and registers with the various indents 3d of the arm 3 according to the relative position of the arms 2 and 3. The ball catch 7 is resiliently held within the indents 3d and aperture 2b by means of a retaining member 8 made preferably of a short strip of resilient material, the one end of which is secured in any desirable manner to the arm 2, while the free end thereof bears against the ball 7. In extending the arm 2, the ball 7 is obliged to ride over the ridges between adjacent indents 3d, the retaining member 8 being deflected rearwardly. As the ball 7 passes over the ridge, the retaining member 8 causes it to snap back into the adjacent indent so that the extension arm 2 may be secured in any desired position, thereby allowing the glare shield to be adjusted to the desired position when the arm 2 occupies the vertical position, as indicated in full lines in Fig. 1. The bracket member 5 consists of the angularly related portions 5a and 5b and the segmental end members 5c. The segmental end members 5c are spaced sufficiently apart to accommodate the upper end of the pivoted arm 3, the rearwardly extending flange portion 3a thereof normally bearing on their outer surfaces against the inner surfaces of the segmental members 5c, as clearly shown in Fig. 5.

The pivot pin 4 around which the arm 3 is adapted to be rotated, is secured at its end to the members 5c near the angle thereof. The arm 3 is registered in its lowered position by the outer edge of the flange portion 3a bearing against the angle member 5b. In order to restrain the arm 3 from swinging backwardly, the lower outer margins of the end members 5c are provided with an inwardly extending detent 5d, as best shown in Fig. 4. In entering its lowered position the flanges 3a of the arm 3 encounter the detents 5d and the latter are forced outwardly until the arm 3 occupies its lowered position at which point the pressure on the detents 5d is released and the latter spring back owing to the resilience of the material, thereby offering an effective catch. In order to hold the pivoted arm 3 in its raised position, one end member 5 is slit along a line parallel with the angle leg 5a at a distance therefrom slightly greater than the width of the flange 3a, as clearly shown in Fig. 3. The adjacent segmental portion 5e is then bent inwardly forming a ledge 5f adapted to register with the edge of the flange 3a when the arm 3 is in its extreme raised position. This is best shown in Fig. 5. Thus the arm 3 is locked in this position owing to the ledge 5f abutting with the edge of the corresponding flange 3a. In order to conveniently withdraw the ledge 5f from in front of the flange portion 3a, a suitable lock lever 6 is secured to the portion 5e of the end member 5c enabling that portion to be sprung out of the way, thereby withdrawing the ledge 5f and releasing the arm 3 which may then be lowered. When raising the arm 3 the flange 3a will force the inwardly bent portion 5e outwards until it reaches its extreme upper position at which point the portion 5e is released and snaps back, thereby automatically locking the arm in the upper position.

The bracket 5 is adapted to be secured to the vehicle frame directly above the windshield in front of the driver of the vehicle. When in the raised position the glare shield extends rearwardly under the roof of the vehicle and out of the way of the driver, and when lowered it occupies a position immediately behind the windshild in line with the vision of the driver. The glare shield serves the purpose of mitigating both the direct and reflected rays of the sun, thereby relieving the eyes of the driver from the consequent strain. It may be also used at night time to mitigate the glare of headlights of approaching vehicles, thus preventing possible accidents due to such glare.

It is obvious from the construction as illustrated in the drawings and described in the foregoing specification that there is provided a device as aimed at and set forth in the objects of the invention and though I have shown and described a particular construction, combination and arrangements of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a device of the class described, an angular sheet metal bracket member having relatively flat end portions, a pivot pin extending between said end portions near the angle of said bracket, an arm for supporting a glare shield pivotally supported on said pin between said end portions, a flange portion on said arm contiguous with one of said end portions, one of said end portions having a slit extending adjacent the edge of said flange when said arm is in the raised position, the normally lower part of said end portion adjacent said slit being bent inwardly to form a ledge for supporting said flange in said raised position, and a grip member secured to the outer side of said lower part for enabling said ledge to be readily retracted for lowering said arm.

2. In a device of the class described, a glare shield including a translucent colored sheet, a frame member for supporting said sheet, an outwardly extending arm secured to said frame member, a second arm pivoted at its one end to a bracket member, a plurality of semispherical indents in said second arm, a ball catch member in said first arm, resilient means for actuating said ball catch member, channel members for holding said arms together in relatively shiftable relation, said catch member adapted to register with said indents for holding said arms in various relatively shifted positions, and means cooperating with said frame member for positively latching said pivoted arm in raised position, and catch means formed in said frame for resiliently restraining said arm in lowered position relative to said bracket.

In testimony whereof, I have hereunto set my hand at San Diego, California, this 30th day of April, 1928.

RAYMOND D. HOGG.